No. 704,568. Patented July 15, 1902.
T. OFFICER.
PACKING RING.
(Application filed Sept. 11, 1901.)
(No Model.)
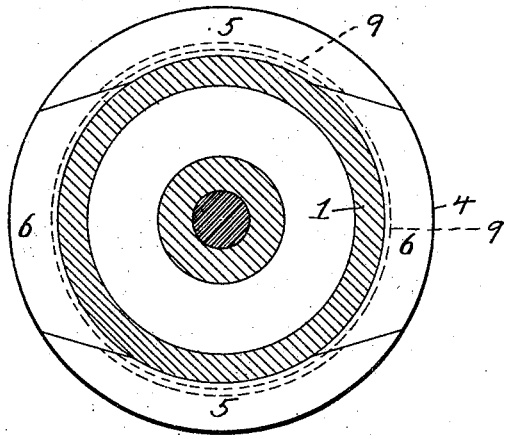
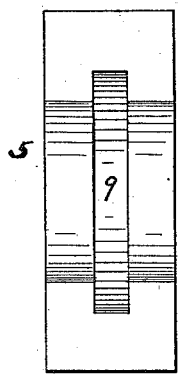
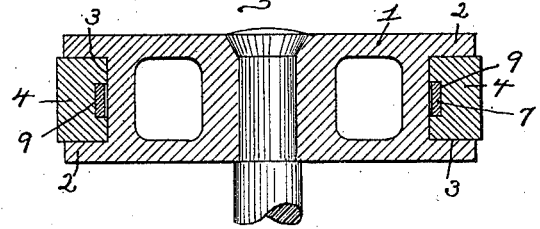
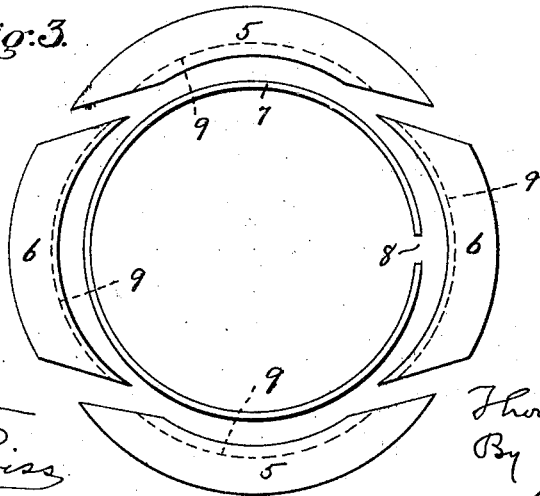
Witnesses.
Inventor.
Thomas Officer,
By Kay & Totten
Attorneys.

UNITED STATES PATENT OFFICE.

THOMAS OFFICER, OF CLAREMONT, NEW HAMPSHIRE, ASSIGNOR TO SULLIVAN MACHINERY CO., OF CHICAGO, ILLINOIS, A CORPORATION OF NEW HAMPSHIRE.

PACKING-RING.

SPECIFICATION forming part of Letters Patent No. 704,568, dated July 15, 1902.

Application filed September 11, 1901. Serial No. 75,092. (No model.)

*To all whom it may concern:*

Be it known that I, THOMAS OFFICER, a resident of Claremont, in the county of Sullivan and State of New Hampshire, have invented a new and useful Improvement in Packing-Rings; and I do hereby declare the following to be a full, clear, and exact description thereof.

My invention relates to metallic packing for pistons and the like; and its object is to provide a packing for this purpose which is simple, cheap to manufacture, and which will maintain a tight joint between the piston and its cylinder under all conditions of wear and use.

In the accompanying drawings, Figure 1 is a cross-section through the piston, showing the packing in side view. Fig. 2 is a diametrical section through the piston and packing. Fig. 3 is a diagrammatic view illustrating the different parts composing the packing slightly separated, and Figs. 4 and 5 are inner face views of the two forms of sections composing the packing.

In the drawings I have shown the invention applied to an ordinary piston 1, the same being provided with flanges 2, thereby providing the groove 3, in which is located the packing 4. The flanges 2 are shown integral with the piston 1; but it is obvious that they may be formed by plates bolted or otherwise secured to the side of the piston-disk.

The packing when in place comprises a complete annulus which projects out beyond the flanges 2 and bears against the inner walls of the cylinder. This annulus is composed of a series of segmental sections, four such sections being shown, although the number may vary as desired or necessary; but said number will always be some multiple of two. These sections are provided with inclined end faces which conform to each other, alternate sections 5 having their ends overlapping the inclined ends of the other sections 6, as shown. No matter what the size of the packing or the number of sections composing the same there will only be the two forms of sections 5 and 6, and in all cases both ends of the one form of sections will be overlapping and both ends of the other form of sections will be overlapped, as shown. The end meeting faces of these sections conform exactly to each other and preferably are plain faces extending entirely through or across the annular packing—that is, from side to side thereof and from its inner to its outer circumferences and on a plane which is substantially parallel to the axis of the annulus—and they are formed on such an angle that as the various sections wear on their outer faces they can expand and still maintain a closed joint at their ends. Any convenient means may be employed for normally holding these sections out against the walls of the cylinder; but I prefer to use a plain annular band-spring 7, open on one side, as at 8, and which has a tendency normally to expand in size. The segmental sections composing the packing are preferably provided on their inner faces with the channels or grooves 9, in which the said band-spring 7 is seated. The groove 9 is shown of greater depth in the sections 5 than in the sections 6, so that the spring-band normally has a bearing against the sections 6, which are the ones with the overlapped ends, and presses said sections outward, so that the inclined ends thereof will bear tightly against the end faces of the sections 5 to maintain the joint normally closed and at the same time carry the sections 5 out against the inner face of the cylinder.

The construction and mode of operation of the packing will be readily understood from the drawings and the foregoing description.

It will be seen that each of the sections composing the packing is very simple in shape, so that it can be easily and cheaply manufactured, that the parts are all simple, and therefore not liable to become displaced or deranged in use, and yet the same are so constructed that a perfectly tight packing will be maintained under all conditions of wear or use.

What I claim as my invention, and desire to secure by Letters Patent, is—

A metallic piston-packing, comprising a plurality of segmental sections having inclined meeting faces, the end of alternate sections overlapping the ends of the adjacent sections, said sections having grooves on their inner faces, the grooves of the overlapping sections being deeper than those in the other sections, and an annular spring-band seated in said grooves and tending to move said sections outward.

In testimony whereof I, the said THOMAS OFFICER, have hereunto set my hand.

THOMAS OFFICER.

Witnesses:
ALBERT BALL,
L. W. HALL.